Figure 1:
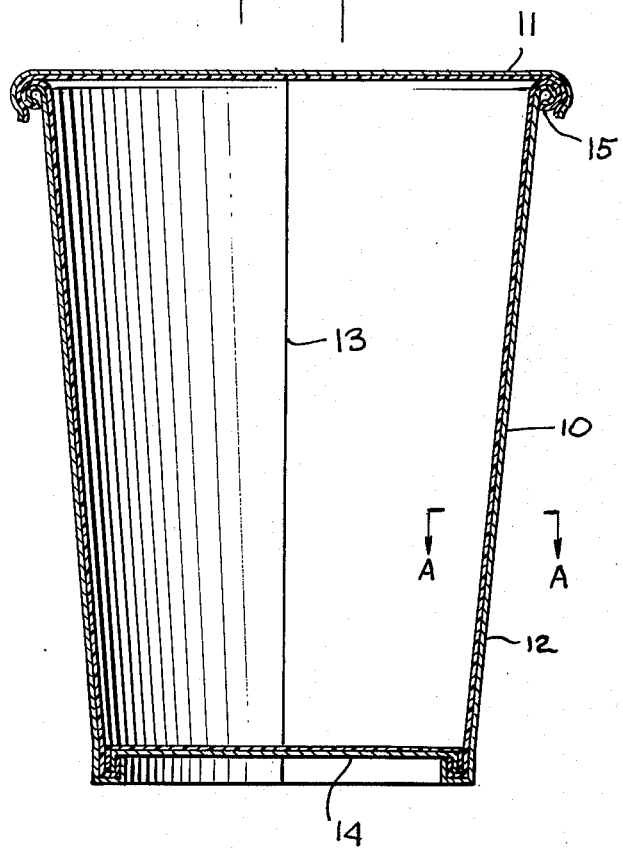

United States Patent [19]
Fumel et al.

[11] 3,988,521
[45] Oct. 26, 1976

[54] LAMINATED STRUCTURES AND METHODS AND COMPOSITIONS FOR PRODUCING SAME

[75] Inventors: Giancarlo J. Fumel, Lake Grove; James A. Karabedian, Garden City, both of N.Y.

[73] Assignee: Owens-Illinois, Inc., Toledo, Ohio

[22] Filed: May 2, 1975

[21] Appl. No.: 573,924

Related U.S. Application Data
[63] Continuation of Ser. No. 275,951, July 28, 1972, abandoned.

[52] U.S. Cl. ............................. 428/35; 229/1.5 B; 229/3.5 R; 428/508; 428/511; 428/515; 428/537
[51] Int. Cl.² .................. B32B 23/08; B32B 27/08; B32B 27/10
[58] Field of Search ...................... 229/1.5 B, 3.5 B; 156/308, 334; 428/35, 508, 511, 515, 537

[56] References Cited
UNITED STATES PATENTS
| | | | |
|---|---|---|---|
| 2,628,180 | 2/1953 | Iverson | 156/308 |
| 2,917,217 | 12/1959 | Sisson | 229/4.5 R |
| 3,387,640 | 6/1968 | Butler | 150/7 |

*Primary Examiner*—Marion E. McCamish
*Attorney, Agent, or Firm*—Brooks Haidt Haffner & Delahunty

[57] ABSTRACT

Methods for bonding two substrates, one of which is polymeric, which comprise coating the surface of at least one substrate with an adhesive composition comprising a major component which is an adhesive for the first substrate and a minor disperse phase which is a solution of a polymer in a solvent for the polymeric substrate and contacting the coated surface of the one substrate with the surface of the other substrate, together with adhesive compositions useful for joining such substrates, laminates so formed, and articles comprised of such laminates.

4 Claims, 2 Drawing Figures

U.S. Patent     Oct. 26, 1976     3,988,521

LAMINATED STRUCTURES AND METHODS AND COMPOSITIONS FOR PRODUCING SAME

This is a continuation of application Ser. No. 275,951 filed July 28, 1972, now abandoned.

BACKGROUND OF THE INVENTION

The present invention relates to methods for bonding substrates, such as polymer sheets to provide laminates for use in fabricating articles such as containers, and to novel laminates and adhesive compositions for laminating such materials.

The use of adhesives for bonding various similar and dissimilar materials is old and well known. However, difficulties still arise when dissimilar materials are to be bonded or laminated to one another, and these difficulties are frequently compounded when the laminates are to be subjected to various factors inimical to the adhesive characteristics of the materials.

One instance of such difficulties is illustrated by the laminated materials sought for use in the large-scale production of disposable containers, such as those used for coffee, soups, and other hot liquids. It is desirable to produce such containers easily and at a minimum of cost so they can be used by the consumer and discarded. It is further desirable that the containers be strong as well as attractively decorated and capable of receiving printing, lithography and the like.

It has accordingly been sought to provide a laminate of paper and polystyrene foam so that the paper can be decorated to provide an attractive appearance and the foam will provide impermeability to liquid contents and low heat transfer, in order that a cup of hot liquid can be comfortably held by the consumer. The dissimilarity of the porous hydrophilic paper substrate and the polystyrene has created problems in obtaining adequate adhesion, and this problem is especially severe when the laminates are to be contacted with hot liquids. In fact, up to the present time, no satisfactory, readily produced laminates, such as those of paper and polystyrene foam have been available to withstand hot liquids.

U.S. Pat. No. 3,378,424 shows the application of polymeric coatings to fibrous substrates. The process there shows treatment of the fibrous substrate with an aqueous emulsion containing a wax and an ethylene-vinyl acetate copolymer. No solvent for the polymeric coating is involved.

U.S. Pat. No. 2,917,217 shows laminates of paper and polystyrene foam, and the adhesive recommended for use is a synthetic resin having a polyvinyl acetate base.

U.S. Pat. No. 2,510,908 shows an adhesive comprising polystyrene, toluene, and a triaryl phosphate plasticizer for bonding polystyrene to paper and other surfaces. The adhesive bonds are not exposed to aqueous or high-temperature environments. U.S. Pat. No. 3,112,235 shows an adhesive method utilizing borates and polyvinyl alcohol.

U.S. Pat. No. 2,628,180 shows an adhesive using styrene monomer, solvent, and an alkoxyethyl stearate evaporation retarder, while U.S. Pat. No. 2,975,093 relates to a process for laminating cellulosic sheets with one another by treating the surfaces of the sheets with polyvinyl alcohol solutions. Various other adhesive compositions and methods are shown in U.S. Pat. Nos. 3,135,648 and 2,434,106.

THE INVENTION

Briefly, the presently described invention provides methods and adhesives for bonding or laminating a first substrate to a high polymer substrate so that the combination is highly resistant to hot aqueous environments. The process comprises applying to the surface of at least one of the substrates a novel adhesive composition and then contacting the adhesive coated substrate and the other substrate to form a strongly bonded structure. The adhesive composition comprises a major component and a minor disperse phase wherein the major component is an adhesive for the first substrate and the minor disperse phase is a polymer dissolved in a solvent for the high polymer substrate. The present invention also contemplates laminates so obtained and articles, such as foodstuff containers and the like, prepared from such laminates.

Figure 2:
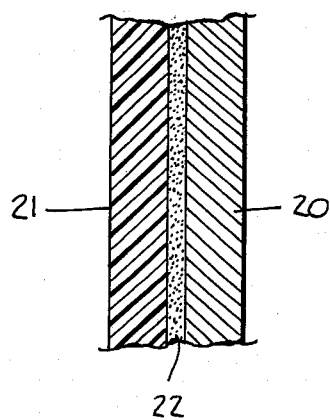

The invention is hereinafter further depicted with reference to the accompanying drawings, wherein FIG. 1 is a sectional view of a container prepared with laminates according to the invention, and FIG. 2 is an enlarged section through A—A of FIG. 1.

The presently described process can be used to provide a strong, temperature-resistant adhesive bond to a wide variety of dissimilar materials. One substrate should be soluble to some significant extent in a solvent, and this solvent should be dispersed as a minor phase in an adhesive bond for the other substrate. Thus, for example, polystyrene can be adhesively bonded to polyvinyl chloride, a polyester, a urethane, or the like.

The invention is herein chiefly described in terms of bonding a single sheet of porous material such as paper to a single sheet of high polymeric material such as polystyrene. It will be understood however by those skilled in the art after reading the present disclosure that any number of layers of high polymer sheets can be so laminated to other materials and that a wide variety of useful articles can thereby be produced.

The term "first substrate" will be used herein to mean one the surface of which can be attacked or penetrated by a liquid adhesive so that a good bond is thereby formed. The solid first substrate can assume a wide variety of physical dimensions, but the present invention is very well adapted to hydrophilic materials such as paper or other nonwoven webs comprising cellulosic fibers such as paper, rayon staples, and the like. The present description is accordingly stated chiefly in terms of laminating high polymer materials to substrates of cellulosic materials.

The term high polymer is used herein to describe the polymeric material which is bonded or laminated to the first substrate. It distinguishes the solid material to be bonded from the hereinafter described polymer which is used in the adhesive composition. The high polymer material is a solid which can be dissolved at least to some extent in a solvent. It is desirably a material such as polystyrene, acrylic, methacrylic, and like high polymers, which can form a fairly rigid structure. A particularly preferred high polymer material herein is polystyrene.

The adhesive composition is coated on or applied to the surface of at least one of the substrates. Coating is herein taken to mean covering the entire surface or substantially the entire surface of the substrate to be bonded with the adhesive composition. For special uses or where it is desirable that only part of the surfaces be bonded to one another, the adhesive composition can be printed, stamped, or otherwise deposited on the substrate surface in a desired pattern. The coating itself is carried out by conventional means such as doctor blades, wire-wound rods, roller mills, gravure rolls, and like devices.

The adhesive composition can be coated on a surface of each of the two substrates to be bonded. Desirably, in certain embodiments of the invention the adhesive composition is coated onto one of the surfaces, and then the composition-coated surface is contacted with the other substrate. The coating compositions are desirably coated onto the substrate surfaces in thicknesses of from about 0.2 mils (thousandths of an inch) to about 3 mils. In certain preferred embodiments of the invention, the adhesive composition is coated onto the high polymer substrate since the minor phase can then begin bond formation. The coating can be carried out in one step or a plurality of steps. In certain preferred embodiments, excellent control of adhesive thickness is obtained by using a wire-wound rod. The thickness is controlled by the diameter of wire wound on the rod.

If desired, after coating the substrate can be permitted to stand for a period of time so that the adhesive composition can form an initial set. In the usual embodiments of this process, the second substrate is contacted with the adhesive coated surface of the first substrate immediately after coating. The contacting is desirably carried out with a roller set or other means to ensure good contact and to express any air bubbles which might be included between the substrates.

Initial bonding of the substrates using the present method is very good, and the ultimate bond strength is reached in a few hours. There will of course be individual variations in bonding time depending upon the particular substrates used, elevated drying temperatures if used, the adhesive components, ambient conditions, and the like. As an instance of bond formation attained by the present invention, a laminate prepared from paper and polystyrene foam will tear in the fibers of the paper substrate when it is sought to separate the substances. Separation does not occur at or within the adhesive interface.

In preferred embodiments of the invention wherein paper is bonded to polystyrene, the paper desirably has a thickness of from about 3 to about 20 mils, and thicknesses of 5 to 15 mils are generally preferred. Thus, paper having a weight of 107 lb/ream (about 10.5 lb/ft$^3$ and 10.5 mil caliper) and of 115 lb/ream (10.7 mil caliper) have given excellent results.

The high polymer should have sufficient thickness to contribute the desired physical properties to the finished article. It is generally utilized in the form of sheets which can be solid or of an expanded structure commonly known as foam. When a foam material is utilized, its thickness and density can be selected to provide any desired insulating properties. On the other hand, excessive thicknesses (and/or density) wastes material and provides no substantial benefits. It is accordingly desirable that the high polymer sheet thickness be from about 5 to about 50 mils and the foam density be from about 4 to about 25 lb/ft$^3$, and thicknesses of 5 to 25 mils and densities of 5 to 20 lb/ft$^3$ are preferred.

The high polymer substrate can be selected from a wide variety of materials. The high polymer can be a homopolymer such as polystyrene or it can be a modified polymer or copolymer such as rubber-modified polystyrene. Such rubber-modified polystyrenes are also known as medium- or high-impact polystyrenes, depending upon the quantity and type of modifier used.

When the high polymer substrate comprises polystyrene, the polymer generally has average molecular weights on the order of 50,000 up to about 400,000. The preferred commercial styrene substrates have molecular weights of from about 120,000 to about 200,000.

The adhesive composition itself is comprised largely on an adhesive for the first substrate. This major component serves to hold the minor phase in suspension. A relatively large quantity of this component is also particularly required with porous substates because such substrates tend to absorb it. Accordingly, the major component desirably comprises from 65 percent to 95 percent or more of the composition, and in preferred embodiments, it comprises 80 to 90 percent of the total composition. All parts, percentages, proportions and ratios herein are by weight unless otherwise indicated.

The major component of the adhesive composition is comprised of a material which is a conventional adhesive for the first substrate. The major component can either be a continuous phase or can itself comprise a plurality of phases. For example, it can be a plasticizer for the first substrate, a plastisol, an organosol, or a latex. The particular type of adhesive utilized as the major component chiefly depends upon the nature of the first substrate, as will be appreciated from the present description by those skilled in the art. The major component must of course not be destructive of, or otherwise damaging to, the high polymer substrate.

Thus, when the first substrate is cellulosic, aqueous latices have been found to provide excellent results as the major component. Such latices are themselves emulsions or such dispersions of small particles of an organic material in a continuous phase of water. Excellent results with cellulosic first substrates have been obtained by using a major adhesive component which is an aqueous emulsion of long-chain hydrocarbon backbones which are randomly and irregularly substituted with side chains having a chain length of not more than about three atoms.

More desirably, the major component comprises copolymers of ethylene with terminally ethylenically unsaturated organic compounds containing from three to five carbons atoms. Such comonomers are alpha-olefins, esters of terminally ethylenically unsaturated monocarboxylic acids and unsaturated aliphatic alcohols, or esters of saturated monocarboxylic acid and terminally ethylenically unsaturated aliphatic alcohols. Examples of such comonomers are unsaturated esters such as vinyl acetate, ethyl or methyl acrylate, and normal lower alpha-olefins such as propylene, butene-1, and pentene-1.

In certain preferred embodiments with cellulosic first substrates and polystyrene polymer substrates, a major component comprising an aqueous emulsion of acetoxylated ethylene-vinyl acetate copolymer has given excellent results. Such major components should have a solids content which is sufficient to form a good bond with the cellulosic substrate but not so much as to create such a high viscosity that the fluid composition does not spread readily on the substrates. The copolymer content of the major component is generally adjusted to provide viscosities in the area of from about 200 to 1200 cp, with preferred viscosities being from about 600 to 700 cp. With the ethylene-vinyl acetate copolymers discussed above, preferred solids contents in the aqueous major component range from about 35 percent to about 60 percent.

The minor phase is dispersed throughout the major component. The minor phase contains a dissolved or solute polymer in a solvent which will at least partially dissolve the high polymer substrate. It will be understood that the polymer dissolved in the minor phase need not be the same as that of the high polymer substrate, although the polymer should be compatible with and capable of adhering to the high polymer substrate.

It is desirable in certain aspects hereof that the polymer be the same chemically as the high polymer forming the substrate. For example, if the substrate is polystyrene then the solute polymer is desirably also polystyrene. In fact, it has been found advantageous that the solute polymer be the same chemically as the high polymer substrate and that it have a molecular weight sufficient to remain substantially unmelted at the temperatures of the liquids to which the bonded substrates are exposed. On the other hand, use of excessively high molecular weight solute polymers makes the minor phase viscous and difficult to disperse in the major component. Based on these considerations, it is desirable that the solute polystyrene polymer have an average molecular weight of from about four to about 100 percent of the high polymer, and it is preferred that the average molecular weight of polystyrene solute polymers be from about 5 percent to about 15 percent of the average molecular weight of the polystyrene in the substrate. This provides greater solubility of the solute polymer in the solvent and facilitates formation of a bond between the solute polymer and the substrate polymer.

The solvent in the adhesive composition is one which will at least slightly attack or etch the surface of the high polymer substrate and permit the formation of a bond with the components of the minor phase. The solvent can be chosen by one skilled in the art from the considerations stated herein. By way of illustration, when the high polymer substrate is polystyrene foam, the solute can be polystyrene, and the solvent can be a liquid solvent for the polystyrene solute and the polystyrene substrate. Such solvents are materials in which solute and polymer substrates have appreciable solubility. In the case of polystyrene, these include such art-recognized liquids as aromatic and substituted aromatic hydrocarbons like benzene, toluene, xylene, styrene, vinyl toluene, and the like, halogenated hydrocarbons and particularly chlorinated and brominated hydrocarbons such as methyl chloride, methylene chloride, chloroform, carbon tetrachloride, trichloroethylene, trichloroethane, methyl bromide, ethyl bromide, propyl bromide, bromoform, tribromoethane, and the like, aliphatic esters such as ethyl acetate, butyl acetate, propyl formate, and the like, methyl, ethyl and butyl phthalate, aliphatic and alicyclic ketones and aldehydes such as methyl ethyl ketone, cyclohexanone, and the like, aliphatic and cyclic ethers such as dibutyl ether, dioxane, tetrahydrofuran, tetrahydrofurfuryl alcohol, glycol formal, diethylene glycol dibutyl ether, propylene oxide, and the like, aliphatic alcohols such as ethylhexanol and the like, organic phosphorus compounds such as tributyl phosphate and the like, organic sulfur compounds such as carbon disulfide, ethyl mercaptan, and the like.

It will further be understood that combinations of two or more such materials or combinations such as acetone-cyclohexane and the like can also be utilized. Some of the solvent systems are preferred for certain applications, depending on the toxicity hazard, economic considerations, the particular material to be used in conjunction with the polystyrene polymeric substrate and so on.

The quantity of solvent used in the composition will be the balance left after the quantity of major component, the quantity of solute polymer, and the quantity of any additional adjuvants are determined in the composition. The quantity of solvent for the solute polymer should be sufficient to dissolve the solute polymer and to etch the surface of the high polymer substrate so that the solute polymer particles will adhere or "anchor" to the high polymer substrate. There is also preferably sufficient solvent so that the evaporation which may occur prior to application will not adversely affect the properties of the adhesive composition. Too much solvent, based on the total composition, will adversely affect the viscosity thereof.

The quantity of solvent to be used is also determined, at least in part, by the nature of the high polymer substrate. Less solvent is required with a coarse-celled foam because the surface cell walls collapse and are easily etched, whereas a dense or fine-celled foam or a solid high polymer generally requires more solvent sufficiently to etch the surface to provide anchor sites. The quantity of solvent is accordingly from about three to about 25 percent of the adhesive composition. In certain preferred embodiments the quantity of solvent is from about 8 percent to about 20 percent of the adhesive composition.

The quantity of solute polymer in the solvent is sufficient to bond with the high polymer substrate at a number of sites sufficient to form a good juncture. In practice it has been found that a quantity of solute polymer to comprise from about 15 to about 50 percent of the minor phase is desirable, and amounts of from about 25 to 35 percent of the solvent are preferred. Accordingly, the solute polymer will generally comprise from about two percent to about 10 percent of the total adhesive composition.

The solvent-solute polymer component must be dispersed substantially uniformly throughout the major component of the adhesive composition. This can be accomplished by the use of a mix tank and vigorous mixing or by high-shear or high-rate mixing devices such as a blendor, a Dispersator and the like. The size of the particles of the minor phase preferably lie in the range of 50 to 125 microns in effective diameter. If the particles are too small a good bond of the high polymer substrate is not obtained, and when the size is too large, the particles may not bond evenly and may also tend to agglomerate and separate from the major phase. Particle sizes of 75 microns have been found to give good results with the polystyrene adhesive compositions of the present invention.

Either the minor phase or the major component of the adhesive composition, or both phases, can contain adjuvant materials to alter, vary, modify or improve, hereinafter simply "alter", the properties of the composition, the laminate or the finished articles. Thus, plasticizers, dyes, anti-microbial agents and other preservatives, whiteners, pigments, insolubilizers, solubilizers, viscosity control agents, other polymers, and like materials can be present in the adhesive composition in amounts which do not essentially affect such compositions. By way of illustration, it has been found desirable in certain embodiments to incorporate an insolubilizing agent such as a Werner-type aliphatic acylato chromic complex into the major phase to remove hydroxyethyl cellulose employed in certain commercially available ethylene-vinyl acetate copolymers as a protective colloid. When the adhesive compositions of this invention are to be used significantly after preparation, it is desirable to utilize preservatives known in the art to protect the composition against oxidation, microbial attack, and the like. The adhesive composition can also contain plasticizers and other such adjuvants to alter the flexibility and temperature-resistance of the adhesively bonded laminate. Additional plasticizers also improve the initial tack or bond formation in some embodiments.

The laminates produced with the adhesive compositions and according to the processes of the present invention are found to have excellent resistance to delamination when in contact with hot, and even boiling, aqueous liquids. Microscopic examination of cross-sections of the laminates shows that particles of the solute polymer are bonded to the surface of the high polymer, and that the particles are, in turn, surrounded by the adhesive of the major component. It is inferred from these studies that the solute polymer is tightly bonded to the high polymer substrate and that the solute polymer is mechanically locked into the major component adhesive. This accounts for the excellent delamination resistance of the laminates of the present invention. It is believed that the relatively large solute polymer particles fuse to the high polymer substrate to form anchor sites and that the fused particles are in turn surrounded by smaller particles (perhaps of large molecular size or colloidal size) of the solids contained in the major component. In such a case the solids of the major component can actually interlock behind or under the solute polymer particles and form a mechanical bond of sorts. The foregoing is inferred on the basis of available evidence and is believed to account for the excellent high-temperature resistance of the laminates, although the present invention provides excellent results whatever the theoretical explanation of its action may be.

Indeed, adhesive compositions for cellulosic substrates and polystyrenes as described herein could be considered to comprise a three-phase system. The water of the aqueous major component would be considered the continuous phase, the solids of the major component could be considered to be one disperse phase, and the minor solvent-solute phase would be a second disperse phase present in lesser amount generally than either of the two other phases.

It is believed that the ratio of sizes of the particles in the major component to the solute-solvent particles of the minor phase should be at least 1:3 and preferably 1:10. In the aqueous systems taught herein for use with cellulosic substrates and polystyrene substrates, the solute-solvent minor phase particle size is about 75 microns, while the ethylene-vinyl acetate copolymers are about 0.3 microns in diameter.

The laminates of the present invention comprise at least one porous substrate adhesively bonded to at least one high polymer substrate by a layer which comprises an adhesive for the porous substrate in which adhesive is dispersed a minor quantity of solute polymer particles. A quantity of these solute polymer particles are fused to the high polymer substrate and thus anchor the adhesive layer to such substrates. Thus, in the illustrative case of paper bonded to polystyrene foam, the laminate comprises a paper sheet, an ethylene-vinyl acetate copolymer having dispersed therein particles of polystyrene, and the polystyrene foam substrate. The thicknesses of the substrates are as set forth herein.

Such laminates are particularly suited to the production of receptacles or containers for solid and liquid materials such as beverages, soups, yogurt, cottage cheese, salads, dips, and other foodstuffs. FIG. 1 shows cup 10 designed for use in serving hot coffee, hot cocoa, hot tea and other such beverages. Also shown is cover or cap 11 made of the same laminate.

The container can be formed by using a mandrel to impart a frusto-conical shape to a laminate blank prepared according to the present invention and then gluing the overlapping portion at seam 13. The container is provided with bottom member 14 crimped in place by tapered sidewall 12. The embodiment shown utilizes a bottom member of the same material as sidewall 12, but it will be understood that a different material such as coated paper, sheet styrene, other plastic, other composite, or the like can be used.

In FIG. 1, cup 10 is provided with a beaded mouth rim 15 to provide strength and a rounded edge at the top of the receptacle. Further, the rim 15 provides an interlocking bead for ready attachment of cover 11 to cup 10. While in the embodiment shown in FIG. 1, cover 11 is constructed of the same material as sidewall 12, an all-plastic, paper, or other composite cover could be used. It will also be noted by those skilled in the art from FIG. 1, that a cup 10 is nestable with similar cups by virtue of its frustoconical form, so that a quantity of such cups can be stored in and dispensed from a space-conserving configuration.

FIG. 2 is a greatly enlarged section through A—A of FIG. 1. It shows outer porous substrate 20 joined to high polymer substrate 21 by adhesive layer 22 containing particles of solute polymer (not actually shown because of their diminutive size). In the embodiment shown, it will be noted that the high polymer substrate 21 forms the interior of cup 10 and porous substrate 20 forms the exterior. In this manner a design can be printed on the substrate 20, while substrate 21 protects it from direct contact with the contents of the cup. Moreover, where porous substrate 20 is a material such as paper, it can contribute to the overall strength and is a structural element of cup 10. It acts in such instances to reinforce high polymer substrate 21.

In another form of constructing articles according to the present invention, a pre-formed high polymer container can be inserted into a paper or other overwrap or outer covering held in a mold. The exterior of the pre-formed high polymer member can be coated with an adhesive composition according to the invention prior to insertion into the overwrap.

The seams of the outerwrap where a pre-formed liner is used or seam 13 in FIG. 1 can be secured by the adhesive compositions disclosed herein. A variety of adhesive compositions can be utilzied to bond the seam, but it is desirable to utilize the adhesive compositions of the present invention, especially in embodiments in which the container is fabricated from laminates as shown in FIG. 1.

It will thus be understood from the present description that containers according to the present invention comprise sidewall and bottom portions, the sidewall portion 12 extending upwardly from the bottom portion 14 to an upper end providing an open mouth rim 15 for the container. At least the sidewall portion is formed from a laminate comprising a layer of a first material 20 secured to a high polymer material 21 by an adhesive for the first material, said adhesive containing polymer particles fused to the high polymer material. The high polymer material, as taught herein, can either be a foam or a solid (unfoamed) high polymer.

The following examples are given to illustrate embodiments of the invention as it is presently preferred to practice it. It will be understood that these examples are illustrative, and the invention is not to be considered as restricted thereto except as indicated in the appended claims.

EXAMPLE I

Four pounds of polystyrene pellets is slowly added to 8 lb. of toluene with constant agitation, the polystyrene having a molecular weight of 18000–24000. Stirring is continued until all of the polystyrene is dissolved in the toluene solvent, and a mixture of 2 lb. of "Santicizer 160" plasticizer (made by Monsanto Company, St. Louis, Mo., U.S.) and 2 lb. of dibutyl phthalate is admixed with the polystyrene-toluene solution.

The plasticizer-containing solution so obtained is then slowly added to 80 lb. of "Aircoflex 510" acetoxylated ethylene-vinyl acetate copolymer (made by Airco Chemical Co., New York, N.Y., U.S.) with continuous vigorous agitation and the vigorous agitation is continued for ten minutes after the addition of the polystyrene solution to provide a dispersion of particles having approximately a 75-micron diameter in the aqueous copolymer. A vortex is maintained during polystyrene solution addition to ensure good dispersion of the solution. The copolymer also contains 2 lb. of Santicizer 160 and 2 lb. of dibutyl phthalate added with stirring prior to dispersion of the polystyrene solution to provide the final adhesive composition.

Blanks of polystyrene foam sheet having a density of 11 lb/ft$^3$, a molecular weight of about 250,000 and a caliper (thickness) of 13 mils and measuring 12 by 5 inches are coated with the adhesive composition using a No. 12 Mayer rod. Paper of the same dimensions and having a caliper of 10.7 mils and a density of 11.5 lb/ft$^3$ is layered over the adhesive-coated polystyrene foam sheet and then rolled to smooth out and eliminate air pockets. After lamination the foam-paper combination is dried for three to four hours at room temperature (about 70° F). The paper and foam are firmly bonded.

EXAMPLE II

An adhesive composition is prepared as in Example I by dissolving 5 lb. of the same polystyrene in 10 lb. of toluene solvent and then dispersing the solution in 85 lb. of the same aqueous acetoxylated ethylene-vinyl acetate copolymer. No plasticizer is used in this composition.

The composition is then coated on a sample of polystyrene foam as in Example I, and a layer of paper is similarly applied to the adhesive composition coating. After four hours of drying, the paper is found to be firmly bonded to the foam.

EXAMPLE III

An adhesive composition is prepared according to the procedure of Example II utilizing 5 lb. of polystyrene having a molecular weight of 25,000 in lieu of the 18000–24000 molecular weight material. Used to laminate paper to polystyrene foam as in Example II, the adhesive composition produces an excellent bond.

EXAMPLE IV

The procedure of Example III is repeated using 3 lb. of polystyrene in lieu of 5 lb. The results are substantially the same, an excellent bond being obtained.

EXAMPLE V

The procedure of Example I is repeated utilizing 8 lb. of Santicizer 160 plasticizer instead of the 4 lb. of Santicizer 160 and 4 lb. of dibutyl phthalate. Half of the plasticizer is added to the polystyrene solution and half to the aqueous copolymer. A good bond of paper to foam is obtained.

EXAMPLE VI

The method of Example I is repeated utilizing 4 lb. of the polystyrene pellets, 4 lb. of toluene solvent, 6 lb. of Santicizer plasticizer, 5 lb. of dibutyl phthalate, and 81 lb. of the aqueous copolymer to prepare the adhesive composition. A good bond is obtained between the foam and paper with this composition.

EXAMPLE VII

The process of Example I is repeated utilizing 2 lb. of polystyrene pellets having a molecular weight of 250,000 and 1 lb. of polystyrene having a molecular weight of 600, 8 lb. of toluene solvent, 3 lb. of dibutyl phthalate plasticizer, and 84 lb. of the aqueous copolymer. A good paper-to-foam bond is obtained.

EXAMPLE VIII

The procedure of Example I is repeated using 2 lb. of polystyrene pellets having a molecular weight of 250,000, 8 lb. of toluene solvent, 6 lb. of Santicizer 160 and 3 lb. of dibutyl phthalate plasticizer and 83 lb. of the aqueous copolymer to prepare the adhesive composition. A good foam-to-paper bond is obtained.

For purposes of comparision, additional compositions are prepared with the following ingredients:

Samele A — 100 parts of Aircoflex 510 aqueous copolymer

Sample B — 83 parts of Aircoflex 510, 5 lb. of Santicizer 160, 6 lb. of dibutyl phthalate, and 6 lb. of polystyrene having a molecular weight of 600

Sample C — Same as B except polystyrene having a molecular weight of 900 is used.

Sample D — 90 parts of Aircoflex 510 containing 10 parts of toluene dispersed therein.

Composition Samples A through D are used to bond paper to foam as in Example I.

The laminated foam and paper strips are evaluated for lamination strength by holding the specimen lengthwise vertically at room temperature with the paper surface facing the inspector. The inspector makes a vertical downward initial tear and then tears the strip in the longitudinal direction. The tear is then evaluated for adhesive failure and cohesive failure.

Separation in the adhesive is regarded as cohesive failure. Separation of the paper and foam without visible sign of either fiber tear in the paper or foam face degradation is regarded as adhesive failure.

Hot water resistance of the laminate is evaluated by cutting samples thereof into strips having dimensions of 8 by 1 inches. In order to avoid water directly reaching the paper component and to stiffen the specimen, a water-resistant tape (Type 410 305L manufactured by 3M, St. Paul, Minn., U.S.) is layered over the paper side of the laminate.

The specimen strips are then immersed in boiling water for one minute and evaluated. In boiling water the foam layer has a tendency to shrink and pull away from the paper so that it curls and causes delamination. An adhesive which holds the foam to the paper under these severe conditions is rated "good". If severe or complete delamination occurs, the laminate is rated as a "failure". Intermediate or superior performances are rated accordingly.

The results of evaluating products of the preceding Examples and Samples are set forth in Table I.

TABLE I

| Specimen | Lamination Strength | Hot Water Resistance |
|---|---|---|
| Sample A | Fair | Failure |
| Sample B | Poor | Failure |
| Sample C | Poor | Failure |
| Sample D | Good | Failure |
| Example I | Excellent | Fair-to-Good |
| Example II | Excellent | Good |
| Example III | Excellent | Good |
| Example IV | Excellent | Good |
| Example V | Good | Fair |
| Example VI | Good | Poor-to-Fair |
| Example VII | Good | Good |
| Example VIII | Good | Fair-to-Good |

It can be seen from the foregoing that there is some variation among laminates prepared according to the present invention, and that certain preferred embodiments give superior results. By contrast, Sample A–D materials all fail in hot water regardless of their original properties.

EXAMPLE IX

A mix tank equipped with a Cowles dissolver is charged with 74.6 parts of aqueous vinyl acetate-acetoxylated ethylene copolymer. A solution of 2.6 parts of approximately 20,000 molecular weight polystyrene in 14 parts of trichloroethylene is added to the mix tank while stirring the contents thereof with the dissolver. After addition of the polystyrene solution is completed, the stirring is continued for an additional ten minutes.

Sufficient water is then added to adjust the viscosity to 670–700 cp, and 4.4 parts of a 20% Quilon C Werner-type stearato chromic chloride complex (manufactured by E. I. Dupont, Wilmington, Del., U.S.) is added to insolubilize the hydroxyethyl cellulose present as a protective colloid in the copolymer. This chloride complex improves the hot water resistance of the copolymer. Sufficient water is then added to adjust the final viscosity of the adhesive composition to 650–700 cp for use in application to the foam.

The adhesive composition so prepared is used in fabrication of a wide variety of laminates using polystyrene foams having densities from about 4 lb/ft$^3$ to 25 lb/ft$^3$ and thicknesses from 5 to 25 mils. These laminates are made with papers of a variety of weights from 8 to 20 lb/ft$^3$ and thicknesses from 3 to 20 mils.

The laminates are used to prepare a variety of containers such as coffee cups, tubs for hot soups, chili, and the like, tops for containers, tall tumblers, and the like. The containers are formed by methods conventionally used for preparation of these articles. In some instances the paper is brightly printed so that the finished articles have a very attractive appearance. These containers all have excellent resistance to hot liquids and exhibit good lamination strength.

It will be understood by those skilled in the art the present description that acrylic and other foamed and non-foamed plastics can be similarly laminated to paper, paperboard, cotton, and other cellulosic or absorbent materials by using suitable polymers, solvents, and dissolved lower polymers. Thus, polyvinyl acetate will bond acrylic plastics to paper with a disperse phase of an acrylic polymer dissolved in an aromatic hydrocarbon. Butadiene-styrene latices are also useful in such systems.

EXAMPLE X

A mix tank equipped with a Cowles dissolver is charged with 81.8 lb. of ethylene-polyvinyl acetate copolymer and a solution of 2.9 lb. of polystyrene (having an average molecular weight of 25,000) in 15.3 lb. of trichloroethylene is added with stirring to maintain a good vortex in the tank. After the polystyrene solution addition is completed, stirring is continued for an additional ten minutes to prepare the adhesive composition.

The adhesive composition is then used to laminate a 10 mil polystyrene sheet to 5 mil paper stock. The paper and polystyrene foam stock are continuously drawn from supply rolls at constant tension maintained by conventional means. The polystyrene web passes over a steel roll where adhesive composition according to the present invention is spread on the web. About two inches further past the steel applicator roll, the web passes over a wire-wound Mayer rod which assures an even, controlled thickness of the adhesive composition. After traveling some eight feet further, the adhesive-coated polystyrene foam web is passed through the nip of a two-roll mill where it contacts the paper web on the coated side of the foam. The laminate is then slit and rewound onto a takeup roll.

Laminate removed from the roll is found to have excellent adhesion between the paper and the foam. Containers prepared from the laminate are found to have excellent resistance to hot coffee, hot tea, boiling water, and hot vegetable soup.

What is claimed is:

1. A container comprising a sidewall portion and a bottom portion, said sidewall portion extending upwardly from said bottom portion to an upper end thereof providing an open mouth rim of the container, said sidewall being formed from a laminated structure comprising: (1) a substrate of a high polymeric material, (2) a substrate of a porous hydrophilic cellulosic material, and (3) a layer bonding said substrates comprising particles of a polymer of the same kind as said high polymeric material substrate (1) but of an average molecular weight of from about 4 to about 100 per cent of said high polymeric material substrate bonded to the surface of said substrate (1) and a predominant amount of a water-dispersible adhesive preferentially adherent to said cellulosic substrate surrounding said bonded particles so as to mechanically interlock with said particles.

2. A container as defined in claim 1 wherein said polymeric substrate (1) is polystyrene, said porous hydrophilic cellulosic material is paper, said adhesive polymer is polystyrene, and said water-dispersible adhesive is a copolymer of ethylene and vinyl acetate.

3. A container as defined in claim 2 wherein said polystyrene adhesive has an average molecular weight of from about 5 to 15 percent of the average molecular weight of the polystyrene substrate and said water-dispersible adhesive is an acetoxylated ethylene-vinyl acetate copolymer.

4. A container as defined in claim 1 wherein said polymeric substrate is a styrene, acrylic or methacrylic polymer, and said porous hydrophilic cellulosic substrate is paper, rayon or paperboard.

* * * * *